(12) United States Patent
Lee et al.

(10) Patent No.: US 10,326,158 B2
(45) Date of Patent: Jun. 18, 2019

(54) BATTERY MODULE

(71) Applicant: LG CHEM, LTD., Seoul-si (KR)

(72) Inventors: Tae Gyu Lee, Daejeon (KR); Bum Choi, Daejeon (KR)

(73) Assignee: LG Chem, Ltd., Seoul-si (KR)

( * ) Notice: Subject to any disclaimer, the term of this patent is extended or adjusted under 35 U.S.C. 154(b) by 0 days.

(21) Appl. No.: 15/862,092

(22) Filed: Jan. 4, 2018

(65) Prior Publication Data

US 2018/0198154 A1    Jul. 12, 2018

(30) Foreign Application Priority Data

Jan. 6, 2017 (KR) .................. 10-2017-0002559

(51) Int. Cl.
*H01M 10/60* (2014.01)
*H01M 10/04* (2006.01)
(Continued)

(52) U.S. Cl.
CPC ..... *H01M 10/0422* (2013.01); *H01M 2/1016* (2013.01); *H01M 2/1077* (2013.01); *H01M 10/60* (2015.04); *H01M 10/61* (2015.04); *H01M 10/613* (2015.04); *H01M 10/615* (2015.04); *H01M 10/643* (2015.04); *H01M 10/655* (2015.04); *H01M 10/62* (2015.04); *H01M 10/625* (2015.04)

(58) Field of Classification Search
None
See application file for complete search history.

(56) References Cited

U.S. PATENT DOCUMENTS 8,852,789 B2    10/2014   Kim
8,980,457 B2 *   3/2015   Kim ................... H01M 2/1077
                                                          429/82
(Continued)

FOREIGN PATENT DOCUMENTS

JP          2000-306560 A      11/2000
KR      10-2012-0047801 A        5/2012
(Continued)

OTHER PUBLICATIONS

Translation of Korean Office Action dated Oct. 26, 2018 from the Korean Patent Office for counterpart Korean patent application No. 10-2017-0002559.

*Primary Examiner* — Scott J. Chmielecki
(74) *Attorney, Agent, or Firm* — Morgan, Lewis & Bockius LLP

(57) ABSTRACT

Disclosed herein is a cylindrical battery module that is capable of effectively discharging heat generated from cylindrical battery cells to the outside and that is capable of stably supporting the battery cells. The cylindrical battery module includes an upper plate provided with a plurality of battery holders for receiving and fixing cylindrical battery cells, the battery holders protruding upward from the upper plate by a predetermined height, a lower plate located under the upper plate, the lower plate being provided with a plurality of battery holders for receiving and fixing cylindrical battery cells, the battery holders protruding downward from the lower plate by a predetermined height, and a middle plate and a cooling plate located between the upper plate and the lower plate.

9 Claims, 6 Drawing Sheets

(51) Int. Cl.
*H01M 10/615* (2014.01)
*H01M 10/613* (2014.01)
*H01M 2/10* (2006.01)
*H01M 10/61* (2014.01)
*H01M 10/643* (2014.01)
*H01M 10/655* (2014.01)
*H01M 10/625* (2014.01)
*H01M 10/62* (2014.01)

(56) References Cited

U.S. PATENT DOCUMENTS

| | | | | |
|---|---|---|---|---|
| 9,083,030 | B2 * | 7/2015 | Park | H01M 2/1077 |
| 9,153,799 | B2 | 10/2015 | Kim et al. | |
| 9,196,883 | B2 | 11/2015 | Kim et al. | |
| 9,306,194 | B2 | 4/2016 | Kim et al. | |
| 2005/0153199 | A1 * | 7/2005 | Yagi | H01M 2/105 |
| | | | | 429/148 |
| 2009/0120620 | A1 * | 5/2009 | Abe | H01M 2/1077 |
| | | | | 165/104.31 |
| 2009/0148754 | A1 * | 6/2009 | Marchio | H01M 2/1077 |
| | | | | 429/83 |
| 2011/0027625 | A1 * | 2/2011 | Payne | H01M 6/50 |
| | | | | 429/50 |
| 2011/0287298 | A1 * | 11/2011 | Park | H01M 2/1077 |
| | | | | 429/156 |
| 2012/0107663 | A1 * | 5/2012 | Burgers | F28F 3/06 |
| | | | | 429/120 |
| 2012/0114985 | A1 | 5/2012 | Kim et al. | |
| 2012/0115011 | A1 | 5/2012 | Kim | |
| 2013/0196184 | A1 * | 8/2013 | Faass | H01M 2/1016 |
| | | | | 429/50 |
| 2014/0113171 | A1 * | 4/2014 | Schaefer | H01M 2/1077 |
| | | | | 429/120 |
| 2016/0072164 | A1 | 3/2016 | Jung | |
| 2016/0285140 | A1 * | 9/2016 | Kimura | H01M 10/6562 |
| 2016/0336629 | A1 | 11/2016 | Cho et al. | |
| 2017/0288286 | A1 * | 10/2017 | Buckhout | H01M 2/1077 |
| 2017/0301964 | A1 * | 10/2017 | Murakami | H01M 2/10 |
| 2018/0145381 | A1 * | 5/2018 | Dinh | F28D 15/0266 |

FOREIGN PATENT DOCUMENTS

| | | | | | |
|---|---|---|---|---|---|
| KR | 20120047801 | A * | 5/2012 | | H01M 2/1077 |
| KR | 10-1520902 | B1 | 5/2015 | | |
| KR | 10-2015-0100529 | A | 9/2015 | | |
| KR | 10-2016-0050692 | A | 5/2016 | | |
| KR | 10-2016-0113972 | A | 10/2016 | | |
| KR | 20160113972 | A * | 10/2016 | | H01M 10/6562 |
| KR | 10-2016-0134066 | A | 11/2016 | | |
| KR | 20160134066 | A * | 11/2016 | | H01M 10/6566 |
| WO | 2016/067517 | A1 | 5/2016 | | |

* cited by examiner

[FIG. 1]
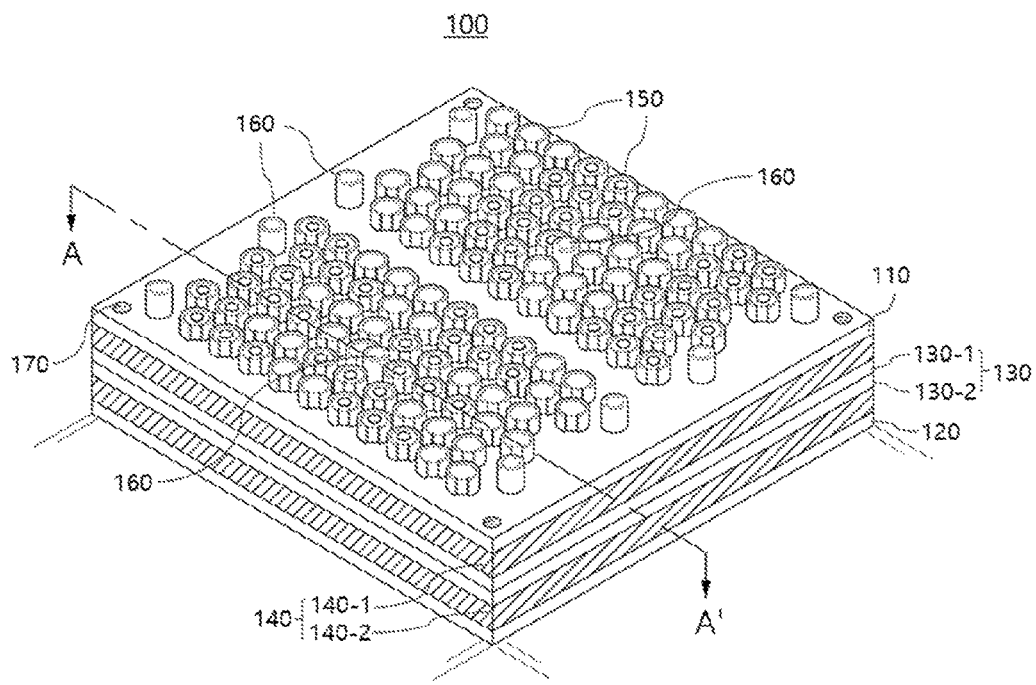

[FIG. 2]
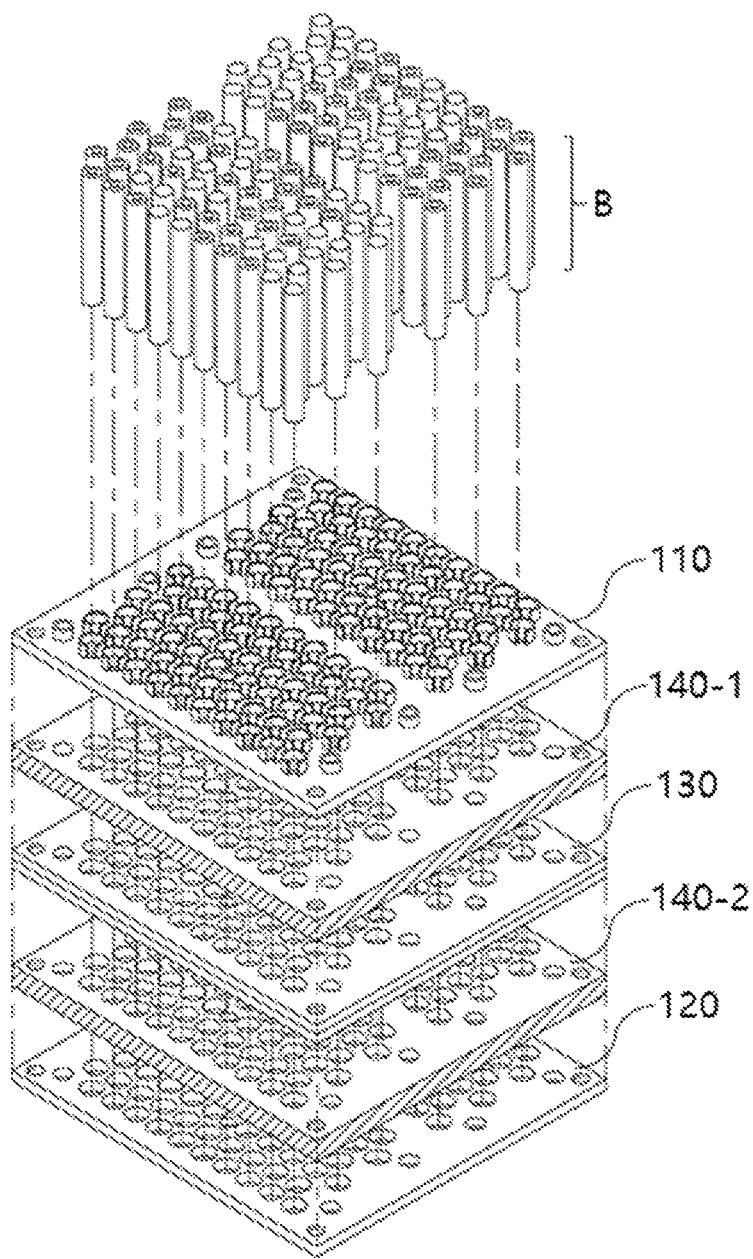

[FIG. 3]
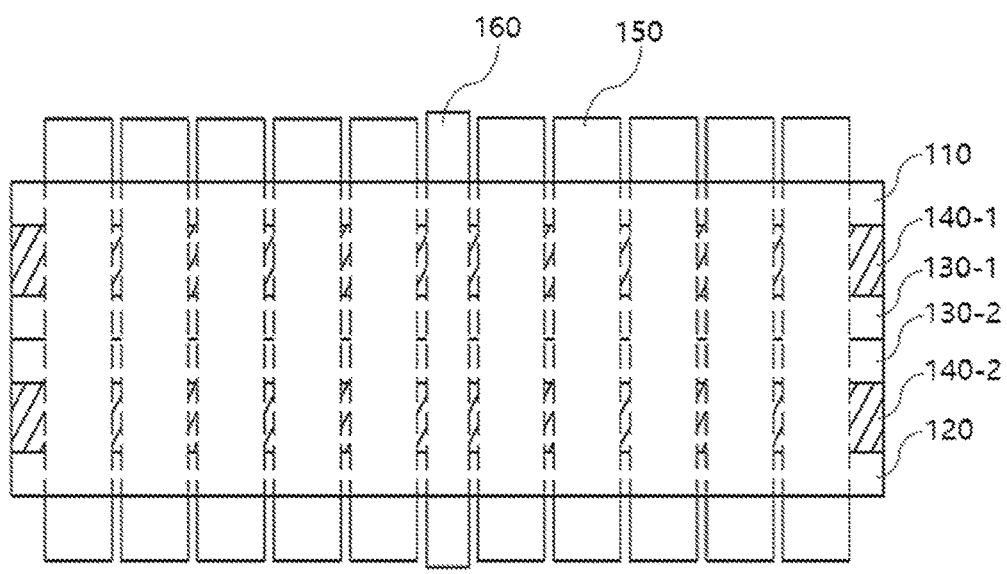

[FIG. 4]
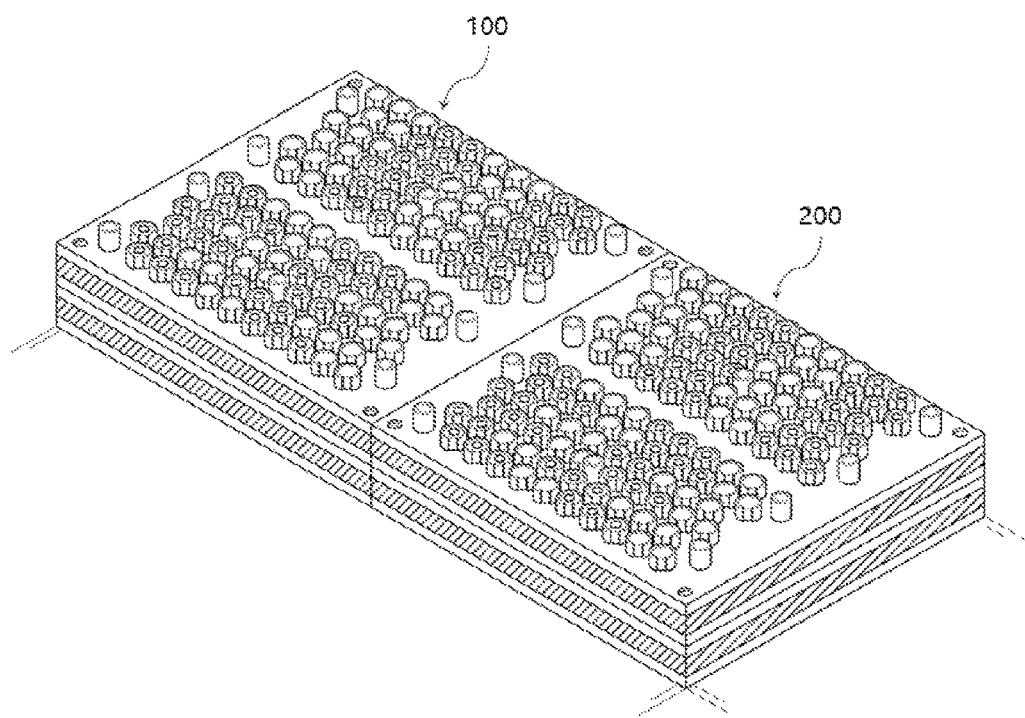

[FIG. 5]
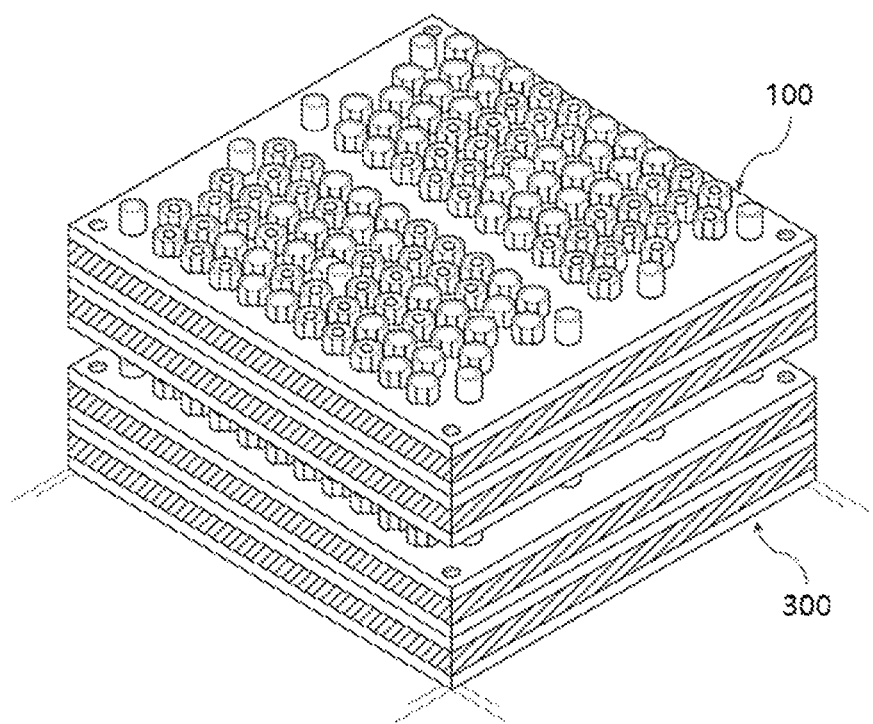

[FIG. 6]
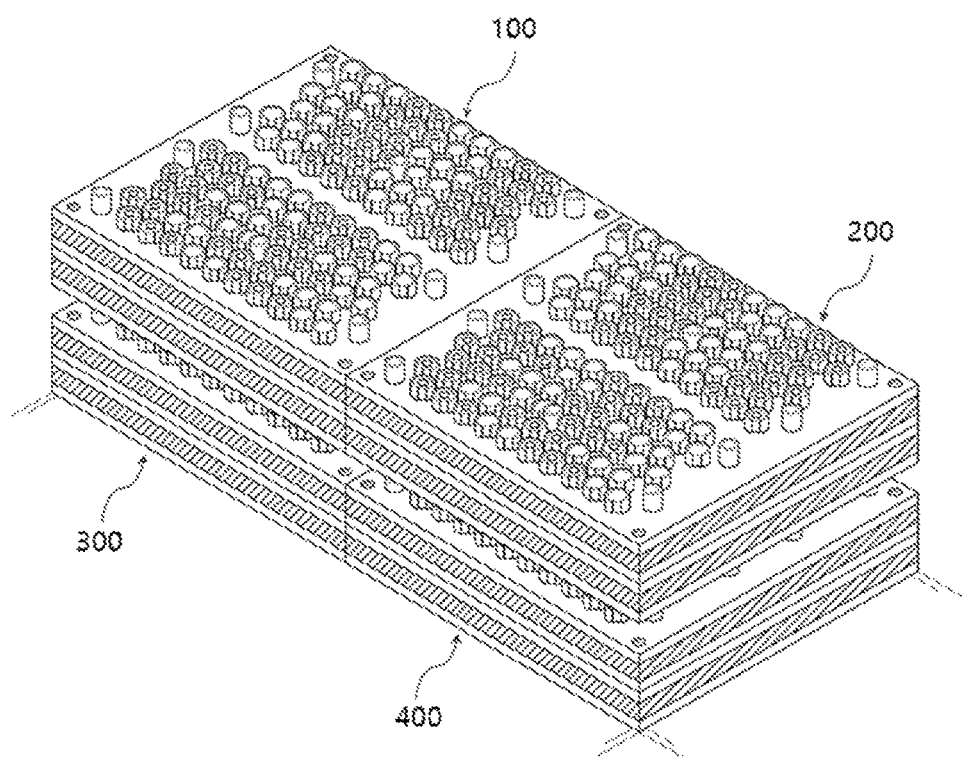

BATTERY MODULE

TECHNICAL FIELD

The present invention relates to a cylindrical battery module, and more particularly to a cylindrical battery module that is capable of effectively discharging heat generated from cylindrical battery cells to the outside and that is capable of stably supporting the battery cells.

BACKGROUND ART

A secondary battery, which is easily applicable to various kinds of products and which exhibits excellent electrical properties, such as high energy density, is widely used in an electric vehicle (EV) or a hybrid electric vehicle (HEV), which is driven using an electrical driving source, as well as portable devices. Such a secondary battery has attracted considerable attention as a new energy source that is eco-friendly and exhibits high energy efficiency, since the secondary battery can remarkably reduce the use of fossil fuels and produces no by-products when energy is used.

Examples of the secondary battery that have been widely used to date include a lithium ion battery, a lithium polymer battery, a nickel cadmium battery, a nickel hydride battery, and a nickel zinc battery. The operating voltage of such a unit secondary battery cell is about 2.5 V to 4.2 V. In the case in which voltage higher than the above-mentioned voltage is required, therefore, a plurality of secondary battery cells may be connected to each other in series in order to constitute a battery pack. In addition, a plurality of secondary battery cells may be connected to each other in parallel in order to constitute a battery pack having required charge and discharge capacities. Consequently, the number of secondary battery cells included in the battery pack may be variously set depending on the required output voltage or required charge and discharge capacities.

Meanwhile, middle- or large-sized devices, such as vehicles, use a battery module including a plurality of battery cells electrically connected to each other or a middle- or large-sized battery pack including a plurality of battery modules as unit modules, because high output and large capacity are necessary for such middle- or large-sized devices. In general, a battery module is manufactured by stacking a plurality of battery cells with high integration. A large amount of heat is generated from the battery cells, which constitute the battery module, during the charge and discharge of the battery cells. If the heat generated from the battery cells during the charge and discharge of the battery cells is not effectively removed from the battery cells, the heat accumulates in the battery cells, with the result that deterioration of the battery cells is accelerated. Depending on the circumstances, the battery cells may catch fire or explode.

For this reason, a high-output, large-capacity battery module or a high-output, large-capacity battery pack needs a cooling system for cooling battery cells mounted in the battery module or the battery pack.

Korean Patent Application Publication No. 2015-0100529 discloses a battery pack for automobiles having improved cooling efficiency. In this related art document, the battery pack for automobiles includes at least one secondary battery, including a negative electrode plate, a separator, and a positive electrode plate, and at least one cooling fin disposed so as to contact an outer case of the secondary battery for cooling the secondary battery, characterized in that at least one end of the cooling fin is disposed so as to contact the body of an automobile, whereby no additional coolant, coolant channel, or pump is needed.

However, it is very difficult to apply the cooling structure disclosed in the related art document to a cylindrical battery cell, since the cooling structure is configured such that a planar cooling fin is interposed between secondary batteries having an approximately hexahedral structure so as to be adjacent to the secondary batteries and the cooling fin dissipates heat generated from the secondary batteries.

RELATED ART DOCUMENT

Patent Document

Korean Patent Application Publication No. 2015-0100529

DISCLOSURE

Technical Problem

The present invention has been made in view of the above problems, and it is an object of the present invention to provide a cylindrical battery module that is capable of effectively discharging the heat generated from cylindrical battery cells during the charge and discharge of the cylindrical battery cells to the outside.

It is another object of the present invention to provide a cylindrical battery module that is capable of stably supporting cylindrical battery cells.

Technical Solution

In accordance with one aspect of the present invention, the above and other objects can be accomplished by the provision of a cylindrical battery module including an upper plate formed in a predetermined shape having a predetermined thickness and a predetermined width, the upper plate being provided with a plurality of battery holders for receiving and fixing cylindrical battery cells, the battery holders protruding upward from the upper plate by a predetermined height, a lower plate located under the upper plate, the lower plate being provided with a plurality of battery holders for receiving and fixing cylindrical battery cells, the battery holders protruding downward from the lower plate by a predetermined height, and a middle plate located between the upper plate and the lower plate.

A coolant channel may be located at a predetermined position of the upper plate, the lower plate, and the middle plate so as to be formed through the upper plate, the lower plate, and the middle plate.

Two or more coolant channels may be formed between the battery holders and/or at outer circumferences of the battery holders.

The middle plate may include a first middle plate and a second middle plate, the first middle plate and the second middle plate being adjacent to each other.

A first cooling plate may be provided between the upper plate and the first middle plate, and a second cooling plate may be provided between the lower plate and the second middle plate.

A first cooling plate may be provided between the upper plate and the middle plate, and a second cooling plate may be provided between the lower plate and the middle plate.

Each of the upper plate, the lower plate, the middle plate, the first middle plate, and the second middle plate may be made of an insulative material, and each of the first cooling plate and the second cooling plate may be made of a thermally conductive metal material.

In accordance with another aspect of the present invention, there is provided a cylindrical battery module including a first battery module and a second battery module, the first battery module and the second battery module being disposed so as to be adjacent to each other in a horizontal direction, wherein each of the first battery module and the second battery module includes an upper plate formed in a predetermined shape having a predetermined thickness and a predetermined width, the upper plate being provided with a plurality of battery holders for receiving and fixing cylindrical battery cells, the battery holders protruding upward from the upper plate by a predetermined height, a lower plate located under the upper plate, the lower plate being provided with a plurality of battery holders for receiving and fixing cylindrical battery cells, the battery holders protruding downward from the lower plate by a predetermined height, a middle plate located between the upper plate and the lower plate, a first cooling plate located between the upper plate and the middle plate, and a second cooling plate located between the lower plate and the middle plate.

In accordance with a further aspect of the present invention, there is provided a cylindrical battery module including a first battery module and a third battery module, the first battery module and the third battery module being disposed so as to be adjacent to each other in a vertical direction, wherein each of the first battery module and the third battery module includes an upper plate formed in a predetermined shape having a predetermined thickness and a predetermined width, the upper plate being provided with a plurality of battery holders for receiving and fixing cylindrical battery cells, the battery holders protruding upward from the upper plate by a predetermined height, a lower plate located under the upper plate, the lower plate being provided with a plurality of battery holders for receiving and fixing cylindrical battery cells, the battery holders protruding downward from the lower plate by a predetermined height a middle plate located between the upper plate and the lower plate, a first cooling plate located between the upper plate and the middle plate, and a second cooling plate located between the lower plate and the middle plate.

Each of the upper plate, the lower plate, and the middle plate may be made of an insulative material, and each of the first cooling plate and the second cooling plate may be made of a thermally conductive metal material.

Advantageous Effects

As is apparent from the above description, in the cylindrical battery module according to the present invention, the cooling plate, which is made of a metal material, is provided between the upper plate and the lower plate, whereby it is possible to rapidly discharge the heat generated from the battery cells to the outside.

Also, in the cylindrical battery module according to the present invention, the cooling plate, which is made of a metal material, is provided between the upper plate and the lower plate, whereby it is possible to prevent the battery cells from being damaged by external impacts and to prevent the battery cells from being distorted in the respective battery holders by external impacts.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a cylindrical battery module according to an embodiment of the present invention;

FIG. 2 is an exploded perspective view of the cylindrical battery module shown in FIG. 1;

FIG. 3 is a sectional view taken along line A-A' of FIG. 1;

FIG. 4 is a perspective view showing a cylindrical battery module according to a first modified embodiment of the present invention;

FIG. 5 is a perspective view showing a cylindrical battery module according to a second modified embodiment of the present invention; and FIG. 6 is a perspective view showing a cylindrical battery module according to a third modified embodiment of the present invention.

DETAILED DESCRIPTION OF THE INVENTION

In the present application, it will be further understood that the terms "comprises," "has," or "includes," etc. specify the presence of stated features, integers, steps, operations, components, parts, or combinations thereof, but do not preclude the presence or addition of one or more other features, integers, steps, operations, components, parts, or combinations thereof.

It will be understood that when a component is referred to as being "connected to" or "coupled to" another component, it may be directly connected to or coupled to another component or intervening components may be present therebetween. In contrast, when a component is referred to as being "directly connected to" or "directly coupled to" another component, there are no intervening components present. Other terms that describe the relationship between components, such as "between" and "directly between" or "adjacent to" and "directly adjacent to," are to be interpreted in the same manner.

In addition, all terms including technical or scientific terms have the same meanings as those generally understood by a person having ordinary skill in the art to which the present invention pertains unless defined otherwise. Generally used terms, such as terms defined in a dictionary, should be interpreted as coinciding with the meanings of the related art from the context. Unless obviously defined in the present invention, such terms are not to be interpreted as having ideal or excessively formal meanings.

Hereinafter, a cylindrical battery module according to the present invention will be described in detail with reference to the accompanying drawings. The same or similar elements are denoted by the same reference numerals even though they are depicted in different drawings, and redundant descriptions thereof will be omitted.

FIG. 1 is a perspective view showing a cylindrical battery module according to an embodiment of the present invention, FIG. 2 is an exploded perspective view of the cylindrical battery module shown in FIG. 1, and FIG. 3 is a sectional view taken along line A-A' of FIG. 1.

The cylindrical battery module according to the present invention may be used in an apparatus that is periodically or non-periodically charged and discharged and that needs to receive electric power, including transportation means, such as automobiles, hybrid vehicles, and electric vehicles.

For example, in the case in which the cylindrical battery module is used for automobiles, a pack case may conform to the specification of a standard battery for automobiles, and the length, the width, and the height of the cylindrical battery module may be set such that the cylindrical battery module can be received in the pack case.

The cylindrical battery module according to the present invention includes an upper plate 110, a lower plate 120, a middle plate 130, and a cooling plate 140.

The upper plate 110 is formed in a predetermined shape. The upper plate 110 is provided with a plurality of battery holders 150 for receiving and fixing of cylindrical battery cells B. The battery holders 150 protrude upward from the upper plate 110. At least one coolant channel 160 for discharging the heat generated from the battery cells during the charge and discharge of the battery cells to the outside is formed so as to be adjacent to the battery holders 150.

In order to improve heat dissipation efficiency, at least one coolant channel 160 may be formed so as to be located between each battery holder 150 and the outer circumference of the battery holder 150.

Meanwhile, the height of each of the battery holders 150 may be slightly less than the height of a corresponding one of the battery cells B, which is located above the upper plate 130, such that the battery cells B can protrude outward. Alternatively, the height of each of the battery holders 150 may be slightly greater than the height of a corresponding one of the battery cells B, which is located above the upper plate 130, such that the battery cells B can protrude outward. The battery cells B, which are located as described above, are electrically connected to each other via a conductive plate (not shown).

The upper plate 110, which includes the battery holders 150, may be made of an insulative material in order to prevent the battery cells B, which are received in the respective battery holders 150, from being electrically connected to each other. Specifically, the upper plate 110 may be made of a thermoplastic resin, which can be easily injection-molded.

The lower plate 120 is located under the upper plate 110. The lower plate 120 is provided to fix the battery cells B while receiving the lower ends of the battery cells B. In addition, the battery holders 150 protrude downward from the lower plate 120. In the same manner as the upper plate 110, at least one coolant channel 160 for discharging heat generated from the battery cells during the charge and discharge of the battery cells to the outside is formed so as to be adjacent to the battery holders 150. The coolant channel 160 is made of an insulative material.

The middle plate 130 is located between the upper plate 110 and the lower plate 120. The cooling plate 140 is located between the upper plate 110 and the middle plate 130 and between the middle plate 130 and the lower plate 120.

Specifically, the middle plate 130 includes a first middle plate 130-1 and a second middle plate 130-2, which are adjacent to each other in the vertical direction. A first cooling plate 140-1 is provided between the upper plate 110 and the first middle plate 130-1, and a second cooling plate 140-2 is provided between the lower plate 120 and the second middle plate 130-2.

The middle plate 130, which includes the first middle plate 130-1 and the second middle plate 130-2, is made of the same insulative material as the upper plate 110 and the lower plate 120. The cooling plate 140, which includes the first cooling plate 140-1 and the second cooling plate 140-2, is made of a thermally conductive metal material.

Conventionally, a cooling method using air or a coolant circulation method is used in order to discharge the heat, generated from the battery cells during the charge and discharge of battery cells, to the outside. In these methods, however, heat is not effectively discharged to the outside if the number of battery cells that are received in the battery holders is increased.

In the cylindrical battery module according to the present invention, the cooling plate 140, which is made of a metal material that exhibits high thermal conductivity, is interposed between the upper plate 110 and the lower plate 120, and the cooling plate is configured to contact the side surfaces of all of the battery cells received in the respective battery holders. Consequently, the heat generated from the respective battery cells can be rapidly discharged to the outside via the cooling plate 140.

Furthermore, the cooling plate 140 is made of a metal material, which is less deformable when impacts are applied thereto than the upper plate 110 and the lower plate 120, each of which is made of an insulative thermoplastic resin. Consequently, it is also possible to prevent the battery cells from being damaged by external impacts or to prevent the battery cells from being distorted in the respective battery holders 150 by external impacts.

Moreover, the middle plate 130 is provided. In the case in which the first cooling plate 140-1 is located above the middle plate 130 and the second cooling plate 140-2 is located under the middle plate 130, therefore, it is possible to adjust the height of the battery module by adjusting the thickness of the middle plate 130, which is lighter than the first cooling plate 140-1 and the second cooling plate 140-2. Consequently, it is possible to provide a battery module that is light while exhibiting excellent heat dissipation efficiency.

Particularly, in the case in which the middle plate 130 includes the first middle plate 130-1 and the second middle plate 130-2, which abut on each other in the vertical direction, it is possible to more easily adjust the thickness of the first cooling plate 140-1 and the second cooling plate 140-2 and to simplify the manufacturing process.

Specifically, the upper plate 110, the first cooling plate 140-1, and the first middle plate 130-1 are different in arrangement from the lower plate 120, the second cooling plate 140-2, and the second middle plate 130-2, but the upper plate 110, the first cooling plate 140-1, and the first middle plate 130-1 are identical in structure to the lower plate 120, the second cooling plate 140-2, and the second middle plate 130-2. Consequently, it is possible to injection-mold and assemble these plates through a single process.

Meanwhile, the material of the cooling plate 140 is not particularly restricted as long as the cooling plate is made of a material that exhibits high thermal conductivity. For example, the cooling plate 140 may be made of aluminum or copper.

In addition, the middle plate 130 and the cooling plate 140 are provided with coolant circulation holes, which communicate with the coolant channels 150 formed in the upper plate 110 and the lower plate 120, such that coolant can be circulated through the coolant circulation holes.

The upper plate 110, the lower plate 120, the middle plate 130, and the cooling plate 140 may be coupled to each other by fastening screws through screw recesses 170. However, the present invention is not limited thereto. It will be obvious that these plates can be fastened using well-known coupling methods.

FIG. 4 is a perspective view showing a cylindrical battery module according to a first modified embodiment of the present invention.

A first battery module 100 and a second battery module 200 may be provided so as to be adjacent to each other in the horizontal direction. The first battery module 100 and the second battery module 200 may be electrically connected to each other in parallel via a conductive plate (not shown) for interconnecting battery cells.

Each of the first battery module 100 and the second battery module 200 is identical in structure to the battery module shown in FIGS. 1 to 3, and therefore a detailed description thereof will be omitted.

Meanwhile, the first battery module 100 and the second battery module 200 may be connected to each other using well-known coupling means, such as an adhesive or welding. Alternatively, the first battery module 100 and the second battery module 200 may be received in a case without using an additional connection means.

FIG. 5 is a perspective view showing a cylindrical battery module according to a second modified embodiment of the present invention.

A first battery module 100 and a third battery module 300 may be stacked so as to be adjacent to each other in the vertical direction. The first battery module 100 and the third battery module 300 may be electrically connected to each other in parallel via a conductive plate (not shown) for interconnecting battery cells. Alternatively, the first battery module 100 and the third battery module 300 may be electrically connected to each other in series.

Each of the first battery module 100 and the third battery module 300 is identical in structure to the battery module shown in FIGS. 1 to 3, and therefore a detailed description thereof will be omitted.

Meanwhile, the first battery module 100 and the third battery module 300 may be connected to each other using well-known coupling means, such as an adhesive, welding, or screw fastening. Alternatively, the first battery module 100 and the third battery module 300 may be received in a case without using an additional connection means.

FIG. 6 is a perspective view showing a cylindrical battery module according to a third modified embodiment of the present invention.

A first battery module 100 and a second battery module 200 may be provided so as to be adjacent to each other in the horizontal direction, and a third battery module 300 and a fourth battery module 400, which are provided respectively under the first battery module 100 and the second battery module 200, may be located so as to be adjacent to each other in the horizontal direction. As a result, the first battery module 100 and the third battery module 300 are stacked so as to be adjacent to each other in the vertical direction, and the second battery module 200 and the fourth battery module 400 are stacked so as to be adjacent to each other in the vertical direction. The first battery module 100, the second battery module 200, the third battery module 300, and the fourth battery module 400 may be electrically connected to each other in parallel. Alternatively, the first battery module 100, the second battery module 200, the third battery module 300, and the fourth battery module 400 may be electrically connected to each other in series.

Each of the first to fourth battery modules 100 to 400 is identical in structure to the battery module shown in FIGS. 1 to 3, and therefore a detailed description thereof will be omitted. In addition, the coupling between the first battery module 100 and the second battery module 200 and the coupling between the first battery module 100 and the third battery module 300 are identical to the coupling in the first modified embodiment of the present invention and the coupling in the second modified embodiment of the present invention, respectively, and therefore a detailed description thereof will be omitted.

Those skilled in the art will appreciate that the present invention may be carried out in specific ways other than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A battery module comprising:
an upper plate formed in a predetermined shape having a predetermined thickness and a predetermined width, the upper plate being provided with a plurality of battery holders for receiving and fixing cylindrical battery cells, the battery holders protruding upward from the upper plate by a predetermined height;
a lower plate located under the upper plate, the lower plate being provided with a plurality of battery holders for receiving and fixing cylindrical battery cells, the battery holders protruding downward from the lower plate by a predetermined height; and
a middle plate located between the upper plate and the lower plate,
wherein a first cooling plate is between the upper plate and the middle plate, and a second cooling plate is between the lower plate and the middle plate.

2. The battery module according to claim 1, wherein a coolant channel is located at a predetermined position of the upper plate, the lower plate, and the middle plate so as to be formed through the upper plate, the lower plate, and the middle plate.

3. The battery module according to claim 2, wherein two or more coolant channels are formed between the battery holders and/or at outer circumferences of the battery holders.

4. The battery module according to claim 2, wherein the middle plate comprises a first middle plate and a second middle plate, the first middle plate and the second middle plate being adjacent to each other.

5. The battery module according to claim 4, wherein the first cooling plate is provided between the upper plate and the first middle plate, and the second cooling plate is provided between the lower plate and the second middle plate.

6. The battery module according to claim 5, wherein each of the upper plate, the lower plate, the middle plate, the first middle plate, and the second middle plate is made of an insulative material, and each of the first cooling plate and the second cooling plate is made of a thermally conductive metal material.

7. A battery module comprising:
a first battery module and a second battery module, the first battery module and the second battery module being disposed so as to be adjacent to each other in a horizontal direction, wherein
each of the first battery module and the second battery module comprises:
an upper plate formed in a predetermined shape having a predetermined thickness and a predetermined width, the upper plate being provided with a plurality of battery holders for receiving and fixing cylindrical battery cells, the battery holders protruding upward from the upper plate by a predetermined height;
a lower plate located under the upper plate, the lower plate being provided with a plurality of battery holders for receiving and fixing cylindrical battery cells, the battery holders protruding downward from the lower plate by a predetermined height;

a middle plate located between the upper plate and the lower plate;

a first cooling plate located between the upper plate and the middle plate; and a second cooling plate located between the lower plate and the middle plate.

8. A battery module comprising:

a first battery module and a third battery module, the first battery module and the third battery module being disposed so as to be adjacent to each other in a vertical direction, wherein each of the first battery module and the third battery module comprises:

an upper plate formed in a predetermined shape having a predetermined thickness and a predetermined width, the upper plate being provided with a plurality of battery holders for receiving and fixing cylindrical battery cells, the battery holders protruding upward from the upper plate by a predetermined height;

a lower plate located under the upper plate, the lower plate being provided with a plurality of battery holders for receiving and fixing cylindrical battery cells, the battery holders protruding downward from the lower plate by a predetermined height;

a middle plate located between the upper plate and the lower plate;

a first cooling plate located between the upper plate and the middle plate; and a second cooling plate located between the lower plate and the middle plate.

9. The battery module according to claim 7, wherein each of the upper plate, the lower plate, and the middle plate is made of an insulative material, and each of the first cooling plate and the second cooling plate is made of a thermally conductive metal material.

* * * * *